(12) United States Patent
Byerly

(10) Patent No.: US 7,297,900 B2
(45) Date of Patent: Nov. 20, 2007

(54) BYPASS WELD TORCH

(75) Inventor: Steven M. Byerly, Cincinnati, OH (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 11/402,594

(22) Filed: Apr. 12, 2006

(65) Prior Publication Data

US 2007/0241082 A1    Oct. 18, 2007

(51) Int. Cl.
*B23K 9/00*    (2006.01)

(52) U.S. Cl. .................. 219/137 R; 219/74; 219/75

(58) Field of Classification Search ............ 219/75, 219/137 R, 137.62, 74
See application file for complete search history.

(56) References Cited

U.S. PATENT DOCUMENTS

| | | | |
|---|---|---|---|
| 2,692,323 A | 10/1954 | Meller | |
| 2,756,311 A | 7/1956 | Persson et al. | |
| 2,837,627 A | 6/1958 | Soulary | |
| 2,863,984 A * | 12/1958 | Schaefer et al. | 219/75 |
| 2,868,954 A | 1/1959 | Skinner et al. | |
| 3,089,019 A * | 5/1963 | Reis et al. | 219/75 |
| 3,274,371 A | 9/1966 | Manz et al. | |
| 3,497,667 A | 2/1970 | Howlett et al. | |
| 3,549,857 A | 12/1970 | Needham et al. | |
| 4,464,560 A * | 8/1984 | Church et al. | 219/137.62 |
| 4,628,182 A | 12/1986 | Hori et al. | |
| 6,008,470 A | 12/1999 | Zhang et al. | |
| 6,013,890 A | 1/2000 | Hulsizer | |
| 6,437,281 B1 | 8/2002 | Zhang et al. | |
| 6,627,839 B1 | 9/2003 | Luckowski et al. | |
| 6,663,013 B1 | 12/2003 | Vanden Heuvel et al. | |
| 6,683,271 B2 | 1/2004 | Rogers | |

FOREIGN PATENT DOCUMENTS

| | | | |
|---|---|---|---|
| DE | 2926210 A | * | 2/1981 |
| JP | 53-34653 A | * | 3/1978 |
| JP | 58-44975 A | * | 3/1983 |
| JP | 9-52175 A | * | 2/1997 |

OTHER PUBLICATIONS

Y.M. Zhang et al., Double-Eletrode GMAW For Base Metal Heat Input Control, pp. 1-6, USA.
Y.M. Zhang et al., Double Electrodes Improve GMAW Heat Input Control, Welding Journal, pp. 1-5, USA.

* cited by examiner

*Primary Examiner*—Clifford C. Shaw
(74) *Attorney, Agent, or Firm*—Dinsmore & Shohl LLP

(57) ABSTRACT

Methods of arc welding and an arc welding assembly comprise a power source configured to provide a welding current, and a single weld housing. The weld housing comprises a welding torch, which comprises a consumable electrode wire. The welding torch defining an elongated member configured to utilize the welding current to melt at least part of the consumable electrode wire and provide welding current to the work piece. The weld housing further comprises a bypass torch defining an elongated member configured to divert a portion of the welding current away from the work piece while allowing other portions of the current to flow to the work piece.

19 Claims, 4 Drawing Sheets

BYPASS WELD TORCH

FIELD OF THE INVENTION

The present invention is generally directed to arc welding assemblies, and is specifically directed to arc welding assemblies comprising bypass torches used to divert current away from the work piece.

BACKGROUND OF THE INVENTION

In conventional gas metal arc welding (GMAW) assemblies, the welding speed depends on the speed of formation of the weld pool used to form the weld join. In GMAW assemblies, a power source delivers current to melt a consumable electrode wire to produce the weld pool. As a result, some arc welding assemblies increase the amount of welding current provided to the consumable electrode wire and work piece to be welded, consequently increasing the melting rate and the welding speed. Providing heat to the work piece is important, because it may facilitate greater penetration of the weld pool inside the work piece, thereby improving the weld strength. However, too much welding current delivered to the work piece may overheat the work piece, and weaken the weld strength.

To reduce overheating of the work piece, a double electrode gas metal arc welding (GMAW) assembly 1 as shown in FIG. 1 has been utilized. Referring to FIG. 1, the assembly 1 comprises a welding contact tip 10 having a consumable wire electrode 12 at its end. The assembly further comprises a bypass torch 20 with a tip 22, which is configured to divert a portion of the welding current away from the work piece. The assembly 1 is configured to provide enough current to increase the melting rate of the consumable wire 12 and the weld speed, while diverting current that would result in the overheating of the work piece.

These benefits notwithstanding, the large size and configuration of the double electrode arc welding assembly 1 and its components prevent the user from accessing the weld joints and work piece, especially for narrower joints. As welding demands increase, the need arises for improvements in bypass torch configurations and components thereof, which provide the user with increased access to the weld joints and work piece, increased maneuverability, and/or lower cost.

SUMMARY OF THE INVENTION

In a first embodiment of the present invention, an arc welding assembly is provided. The arc welding assembly comprises a power source configured to provide a welding current, and a single weld housing. The weld housing comprises a welding torch, which comprises a consumable electrode wire. The welding torch defining an elongated member configured to utilize the welding current to melt at least part of the consumable electrode wire and provide welding current to the work piece. The weld housing further comprises a bypass torch defining an elongated member configured to divert a portion of the welding current away from the work piece while allowing other portions of the current to flow to the work piece.

In a second embodiment of the present invention, an arc welding assembly is provided. The arc welding assembly comprises a power source configured to provide a welding current, and a single weld housing. The single weld housing comprises a welding torch, which comprises a consumable electrode wire. The welding torch defines an elongated member disposed inside the housing, and configured to utilize the welding current to melt at least part of the consumable electrode wire and provide welding current to the work piece. The single weld housing further comprises a bypass torch defining an L-shaped member substantially parallel to the welding torch and coupled to the weld housing. The bypass torch is configured to intersect with the welding torch and divert a portion of the welding current away from the work piece while allowing other portions of the current to flow to the work piece.

In a third embodiment of the present invention, a method of arc welding is provided. The method comprises providing an arc welding assembly comprising a power source configured to provide a welding current, and a single weld housing comprising a welding torch and a bypass torch. The method further comprises delivering a welding current from the power source to the welding torch, diverting a portion of the welding current through the bypass torch, and delivering the non-diverted welding current to a work piece.

Additional features and advantages provided by the bypass torch of the present invention will be more fully understood in view of the following detailed description, in conjunction with the drawings.

BRIEF DESCRIPTION OF THE DRAWINGS

The following detailed description of the illustrative embodiments of the present invention can be best understood when read in conjunction with the following drawings, where like structure is indicated with like reference numerals and in which.

DETAILED DESCRIPTION OF THE ILLUSTRATIVE EMBODIMENTS

Figure 1:
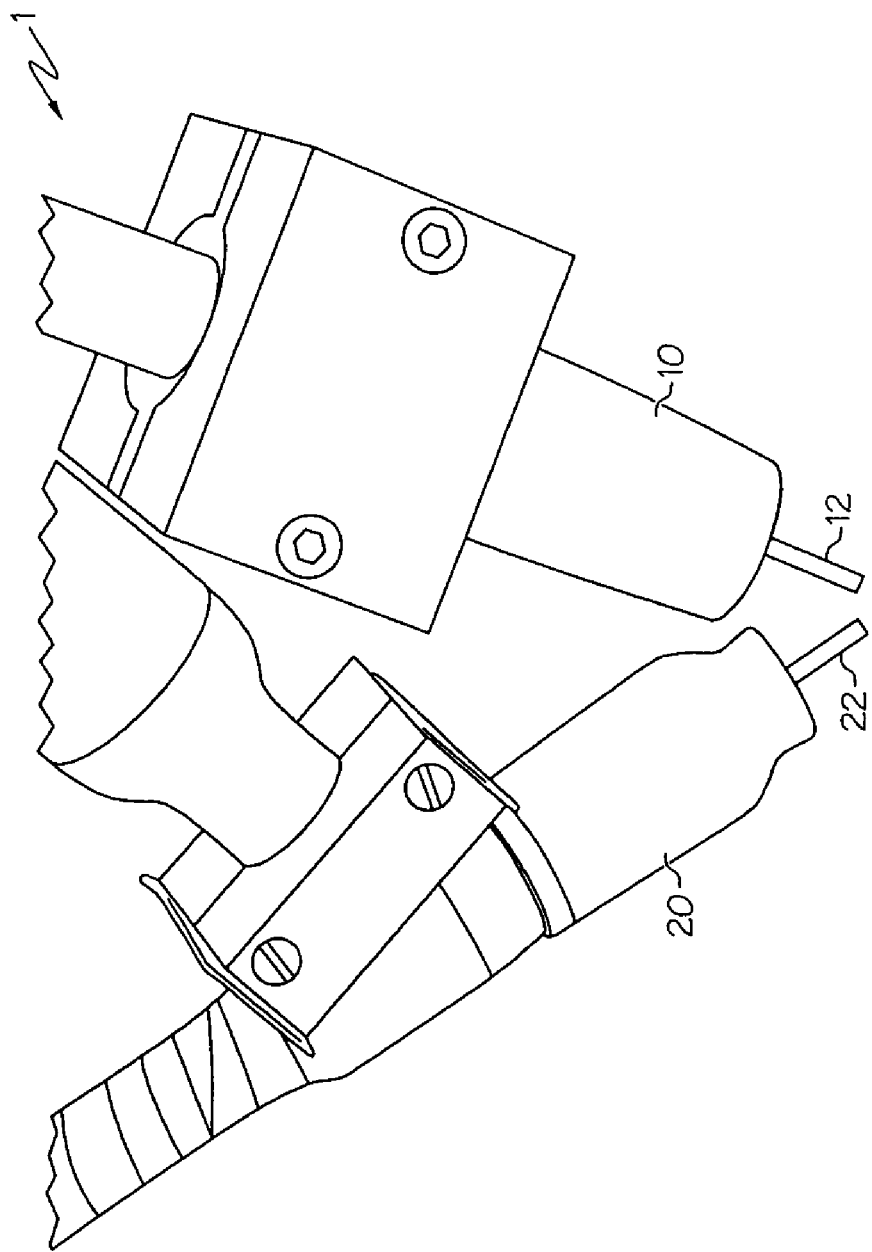
FIG. 1 (Prior Art) is an example of an arc welding assembly known to one of ordinary skill in the art.
Figure 2:
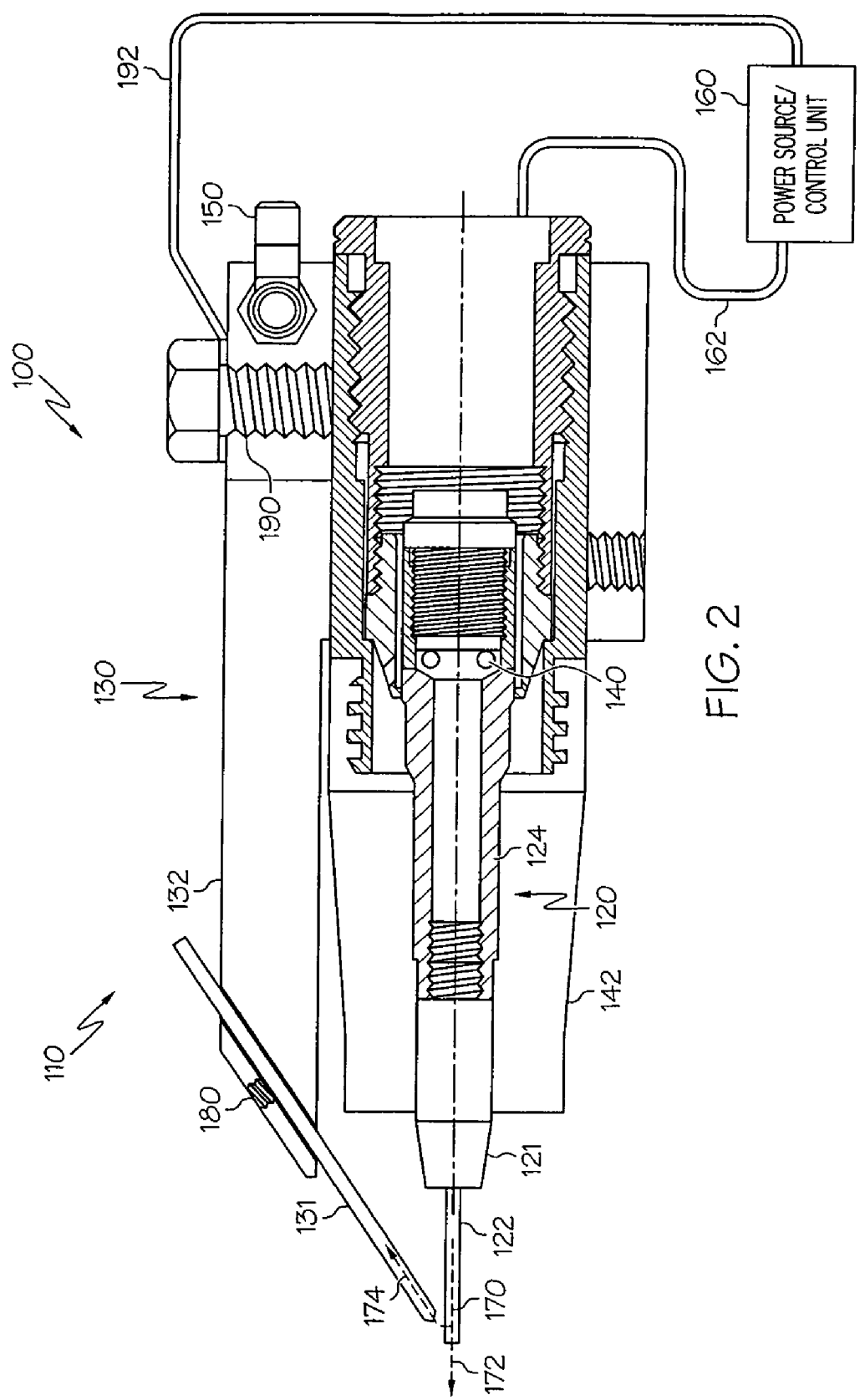
FIG. 2 is a cross-sectional view of an example of an arc welding assembly according to one or more embodiments of the present invention.

Referring to an embodiment as shown in FIG. 2, an arc welding assembly 100 is provided. In one embodiment, the arc welding assembly 100 is a gas metal arc welding (GMAW) assembly; however, other types of arc welding assemblies known to one skilled in the art are contemplated herein. Although not described in great detail herein, arc welding processes, especially gas metal arc welding, are familiar to one of ordinary skill in art, and are considered part of the present invention. The arc welding assembly 100 comprises a power source 160 configured to provide a welding current 170 to an arc welding assembly 100. In one embodiment, the power source 160 may connect to the arc welding assembly 100 via a power cord 162. The power source 160, which comprises any suitable component operable to provide current, includes, but is not limited to, constant voltage direct current power sources, constant current sources, alternating current sources and the like. In one embodiment, the power source 160 may be an arc welding controller from Daihen®. The amount of current depends on the materials of the wire and the work piece. In one exemplary embodiment, the power source delivers from about 200 to about 250 amps of current.

The arc welding assembly 100 further comprises a single weld housing 110 composed of a durable polymeric material e.g. a ceramic composition, or a durable metal or metal alloy material e.g. a steel composition. The single weld housing 110 can comprise a welding torch 120. The welding torch 120 can comprise a contact tip 121 and a consumable electrode wire 122 disposed therein. In one exemplary embodiment, the tip 121 and electrode wire 122 form a coaxial arrangement. The contact tip 121 comprises conductive material, for example, a conductive metal, configured to deliver welding current 170 to the consumable electrode wire 122 and the work piece. For example, and not by way of limitation, the contact tip 121 comprises copper or tungsten. In a further embodiment, the welding torch 120 comprise a guide component configured to align the contact tip 121, and/or the consumable electrode wire 122 inside the welding torch 120. The guide component 124 comprises a conductive material, for example, alloy materials, such as brass.

In another embodiment as shown generally in FIG. 2 (see also FIGS. 3-4), the arc welding assembly 100 may comprise a feed unit (not shown) to feed the consumable wire 122 to the welding torch 120. All feed units suitable to feed the consumable wire 122 to the welding torch 121 are contemplated herein. In one embodiment, the feed unit comprises a robot. In the illustrated embodiments of FIGS. 2-4, the electrode wire 122 is fed through the welding torch 120; however, it is contemplated herein that the electrode wire 122 could be its own component separate from the welding torch 120. In one exemplary embodiment as shown in FIG. 2, the consumable electrode wire 122 may be fed coaxially through the center of the welding torch 120. The welding current 170, which is delivered to the consumable electrode wire 122 via the contact tip 121, melts at least part of the consumable electrode wire 122 to generate the weld pool used in the welding process. The consumable electrode wire 122 may also deliver some current to the work piece. The electrode wire 122 can comprise conductive materials, for example, conductive metal materials familiar to one of ordinary skill in the art. In one exemplary embodiment, the consumable electrode wire 122 may comprise steel, and/or various steel alloys. In a further embodiment, the electrode wire 122 comprises a metal material substantially similar to the metal material of the work piece.

Referring to the embodiment of FIG. 2 (see also FIGS. 3-4), the arc welding assembly 100 may further comprise a gas diffuser 140 configured to deliver shielding gas in proximity to the weld area. The shielding gases are used to protect a welding area from atmospheric gases. The shielding gases provided by the gas diffuser 140 include, but are not limited to, inert gases or carbon dioxide. The gas diffuser 140 generally comprises a non-conductive material, for example, polymers or synthetic resins, which may include plastic or bakelite. In a further embodiment, the arc welding assembly 100 further comprises a gas nozzle 142 at least partially surrounding at the welding torch 120. The gas nozzle 142, which is coupled to the weld housing, is configured to maintain the shielding gases in the weld area and is further configured to at least partially protect against atmospheric gases in the weld area. The gas nozzle 142 may comprise any suitable durable material known to one or ordinary skill in the art. In one embodiment, the gas nozzle 142 may comprise a composition composed at least partially of a conductive metal. In some exemplary embodiments, the gas nozzle 142 may include, but is not limited to, nickel, iron, molybdenum, tungsten based material, carbon steel, or alloys and combinations thereof.

Figure 3:
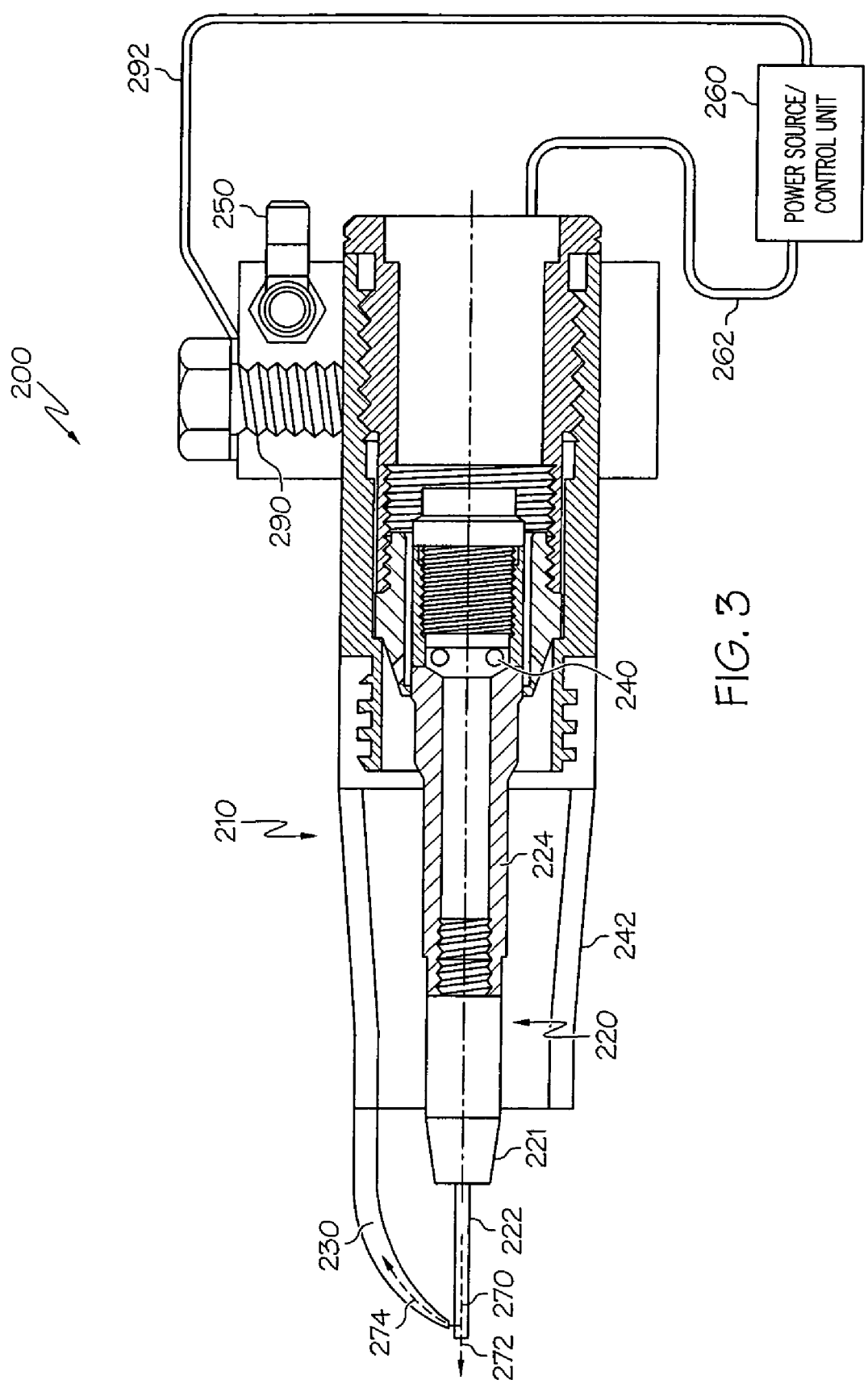
FIG. 3 is another cross-sectional view of an example of an arc welding assembly according to one or more embodiments of the present invention.
Figure 4:
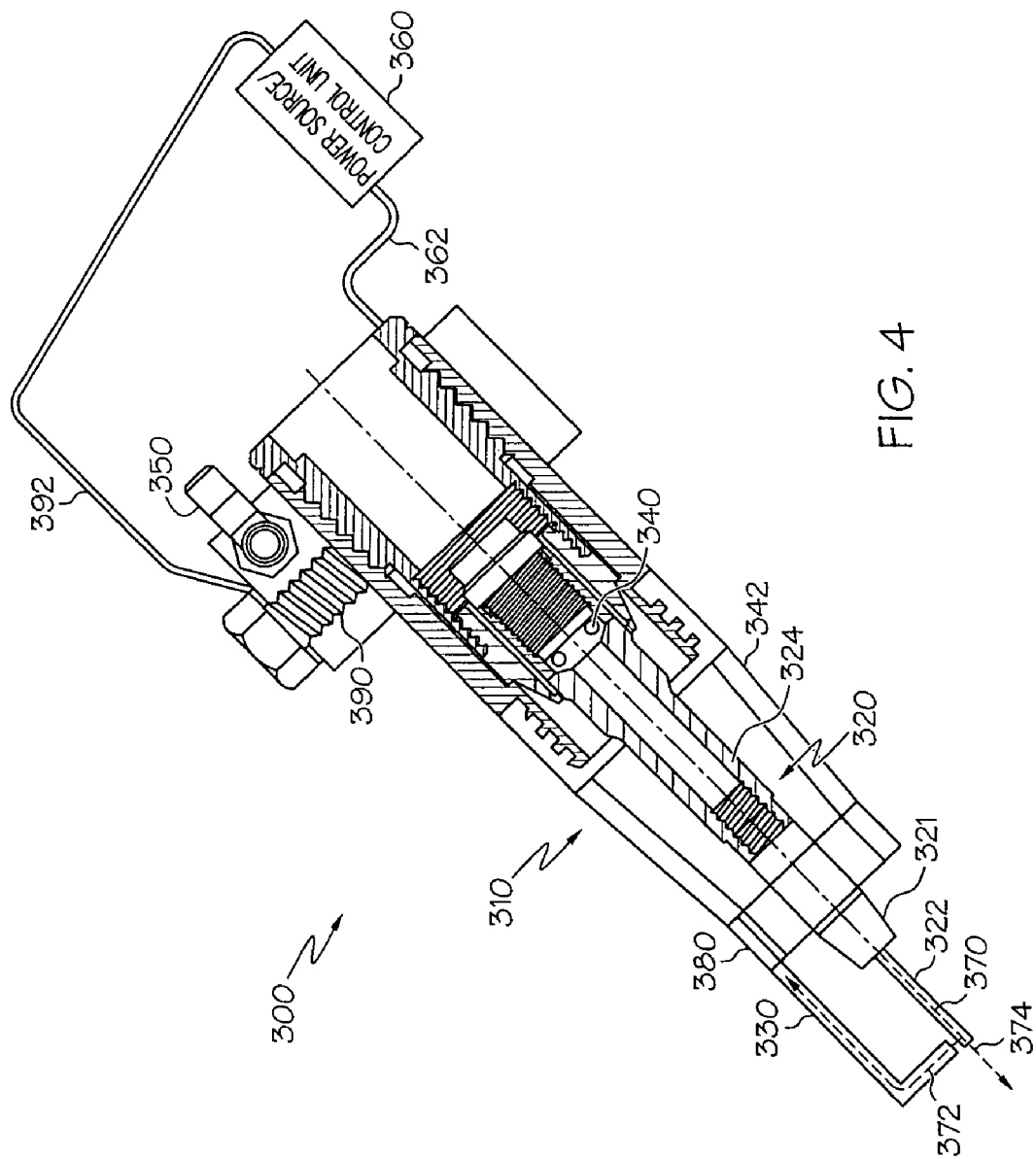
FIG. 4 is another cross-sectional view of an example of an arc welding assembly according to one or more embodiments of the present invention.

Referring to FIG. 2 (see also FIGS. 3-4), the weld housing 110 may further comprise a bypass torch 130 configured to divert a portion 174 of the welding current 170 back to the arc welding assembly, while allowing other portions 172 of the current to flow to the work piece. As shown in the embodiments of FIGS. 2-4, it is readily apparent that bypass torches may comprise various configurations, shapes and dimensions in the arc welding assembly. As shown in FIG. 2 (see also FIGS. 3-4), the bypass torch 130 may occupy at least part of the outer surface of the weld housing 110. In another embodiment, the bypass torch 130 may define an elongated member substantially parallel to the welding torch 120.

Referring to an embodiment as shown in FIG. 2, the bypass torch 130 may define a substantially elongated rod 132 with a slanted end portion. The slanted end portion may comprise a bypass electrode wire 131 coupled to the elongated rod 132. As shown in the embodiment of FIG. 2, the bypass electrode wire 131 is arranged at an angle, for example, an acute angle, relative to the elongated rod 132. The bypass electrode wire 131 may be coupled to the elongated rod 132 via various coupling mechanisms familiar to one of ordinary skill in the art, for example, screw, bolt, etc. In the embodiment of FIG. 2, the coupling mechanism is a spring plunger 180. The elongated rod 132 and bypass electrode wire 131 both comprise a conductive metal material, for example, steel, tungsten, copper, and combinations thereof. In one embodiment, the rod 132 comprises steel, and the bypass electrode wire 131 comprises tungsten.

The bypass torch 130 may, in a further embodiment, comprise an electrical contact 190 for delivering the current back to the power source 160. The electrical contact 190, which typically is adjacent or coupled to the elongated rod 132, may comprise any suitable conductive material, for example, copper. The bypass electrical contact 190 may be coupled to the power source 160 via an electrical cable 192. In operation, the diverted current 174 passes through the bypass electrode wire 131 and elongated rod 132, and is then conducted through the electrical contact 190 to the power source 160 via the electrical cable 192.

Referring to another embodiment as shown in FIG. 3, the bypass torch 230 defines a substantially elongated member having a curved edge portion. In a further embodiment, the bypass torch 230 may be coupled to or bonded to the gas nozzle 242. In this embodiment, the gas nozzle 242 would, in addition to maintaining shielding gases in the weld area, constitute a component of the bypass torch 230. The gas nozzle 242 acts as a conductive member configured to deliver diverted current 274 to the bypass contact 290. Consequently, the gas nozzle 242 is preferably comprised of conductive material, such as a conductive tungsten based ceramic material. Referring to the FIG. 3 embodiment, the weld housing 210 may define a coaxial arrangement wherein the welding torch 220 extends through the center of the weld housing 210 and the bypass torch 230 extends along the outer circumference of the housing 210, thereby at least partially surrounding the welding torch 220.

Referring to another embodiment as shown in FIG. 4, the bypass torch 330 defines a removable L shaped member 330 coupled to the weld housing 310. In addition to the illustrated L shaped member in FIG. 4, other suitable shapes, configurations, and dimensions for the bypass torch 330 are contemplated herein. As shown in FIG. 4, the bypass torch 330 may be coupled to the weld housing 310, specifically by coupling with the gas nozzle 342. Similar to the FIG. 3 embodiment, the gas nozzle 342 may act as a component of the bypass torch 330. Referring to FIG. 4, the bypass torch 330 is coupled to the weld housing via a spring plunger 380 as shown; however, other coupling mechanisms are also contemplated herein.

In each of the examples provided in FIGS. 2-4, the bypass torch 130/230/330 is connected (directly or indirectly) to the welding torch 120/220/320. In one embodiment, the bypass torch 130/230/330 may intersect with the welding torch, or specifically the consumable electrode wire 122/222/322. In another embodiment, the bypass torch 130/230/330 and welding torch 120/220/320 do not intersect, but maintain a distance close enough to allow the bypass torch 130/230/330 to divert a portion of the welding current 170/270/370 from the welding torch 120/220/320. In a few exemplary embodiments, the largest distance between a portion of the bypass torch 130/230/330 and the welding torch 120/220/320 is less than about 2 mm to about 3 mm.

The amount of current provided to the work piece or diverted through the bypass torch may vary depending on the work piece material and the weld material i.e. the composition of the consumable electrode wire 122. In a further embodiment as shown in FIG. 2, the welding current 170, the diverted current 174, and the non-diverted current 172 may be regulated by a control component 162. In the embodiment of FIG. 2, the control component 162 is part of the power source 160; however a separate control component is contemplated herein. In a few exemplary embodiments, the control component 160 may comprise a processor, a computer, programmable logic controller or the like.

For illustration of how welding current 170 is diverted, the following numerical example is provided. As a threshold, the welding current 170 approximately equals the sum of the diverted current 174 and non-diverted current 172. The power source provides 250 amps of welding current to melt the wire 122. The bypass torch 130 may divert as much or as little current as desired. For example, the bypass torch 130 may divert 125 amps back to the power, so that the remaining 125 amps flow to the work piece.

In a further embodiment, the arc welding assembly may further comprise a water cooling attachment 150, for example, a water cooled fixture, operable to cool the arc welding assembly 100. The water cooled fixture 150 may comprise any suitable material known to one of ordinary skill in the art, for example, copper or stainless steel. The water cooled fixture 150 may be placed in various locations on the arc welding assembly 100. Referring to FIG. 2, the water cooled fixture 150 is provided adjacent the bypass torch 130 for cooling the bypass torch components 130 as well as the weld housing 110 as a whole.

Referring generally to FIGS. 2-4, the arc welding assemblies comprise the single weld housing 110 configuration, which include the welding torch 120 and the bypass torch 130. This single weld housing configuration can be more easily maneuvered and can be brought close to a variety of weld joints and work pieces, especially those with narrow weld openings. The assembly 100 increases access to the weld joints and the work piece, while also reducing costs.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the terms "substantially" and "about" are utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. An arc welding assembly comprising:
   a power source configured to provide a welding current; and
   a single weld housing comprising,
      a welding torch comprising a consumable electrode wire and defining an elongated member disposed inside the housing, the welding torch being configured to utilize the welding current to melt at least part of the consumable electrode wire and provide welding current to the work piece; and
      a bypass torch occupying at least part of the outer surface of the weld housing and configured to divert a portion of the welding current away from the work piece while allowing other portions of the current to flow to the work piece.

2. An arc welding assembly according to claim 1 wherein the bypass torch is substantially parallel to the welding torch.

3. An arc welding assembly according to claim 1 wherein the weld housing defines a coaxial arrangement wherein the welding torch extends through the center of the weld housing and the bypass torch extends along the outer circumference of the housing, thereby at least partially surrounding the welding torch.

4. An arc welding assembly according to claim 1 wherein the bypass torch comprises a curved edge portion, a slanted edge portion, or combinations thereof.

5. An arc welding assembly according to claim 1 wherein the bypass torch defines a removable L shaped member coupled to the weld housing.

6. An arc welding assembly according to claim 1 wherein the bypass torch is coupled to the weld housing by a spring plunger.

7. An arc welding assembly according to claim 1 further comprising a gas diffuser coupled to the housing and configured to provide a shielding gas in order to protect a welding area from atmospheric gases.

8. An arc welding assembly according to claim 7 further comprising a gas nozzle configured to ensure shielding gases are maintained in proximity to a welding area.

9. An arc welding assembly according to claim 1 wherein the welding torch further comprises a contact tip configured to deliver current to the work piece and the consumable electrode wire.

10. An arc welding assembly according to claim 1 wherein the welding torch further comprises a contact tip configured to deliver current to the work piece and the consumable electrode wire.

11. An arc welding assembly according to claim 1 further comprising a control component configured to regulate the amount of current provided to the work piece, and/or the amount of current diverted through the bypass torch.

12. An arc welding assembly according to claim 11 wherein the control component is contained within the power source.

13. An arc welding assembly according to claim 1 further comprising a water cooling attachment.

14. An arc welding assembly according to claim 1 further comprising an electrical contact configured to provide the diverted current from the bypass torch back to the power source.

15. An arc welding assembly comprising:
a power source configured to provide a welding current;
a single weld housing comprising,
   a welding torch comprising a consumable electrode wire and defining an elongated member disposed inside the housing, the welding torch being configured to utilize the welding current to melt at least part of the consumable electrode wire and provide welding current to the work piece; and
   a bypass torch occupying at least part of the outer surface of the weld housing and defining an L-shaped member substantially parallel to the welding torch, the bypass torch configured to divert a portion of the welding current away from the work piece while allowing other portions of the current to flow to the work piece.

16. An arc welding assembly according to claim 15 further comprising a control component configured to regulate the amount of current provided to the work piece, and/or the amount of current diverted through the bypass torch.

17. A method of arc welding comprising:
providing an arc welding assembly comprising a power source configured to provide a welding current, and a single weld housing comprising a welding torch with a consumable electrode wire and a bypass torch occupying at least part of the outer surface of the weld housing;
delivering a welding current from the power source to the welding torch;
diverting a portion of the welding current through the bypass torch; and
delivering the non-diverted welding current to a work piece.

18. A method according to claim 17 further comprising delivering the diverted current back to the power source.

19. A method according to claim 17 further comprising producing a weld pool by melting a consumable wire of the welding torch via the non-diverted welding current.

* * * * *